(12) United States Patent
Hagedorn et al.

(10) Patent No.: US 10,780,766 B2
(45) Date of Patent: Sep. 22, 2020

(54) VEHICLE DOOR ASSEMBLIES

(71) Applicant: FORD GLOBAL TECHNOLOGIES, LLC, Dearborn, MI (US)

(72) Inventors: Gregory Hagedorn, Bloomfield Hills, MI (US); Cory Stuffelbeam, Dayton, OH (US); Craig Rackers, Troy, MI (US); Johnathan Andrew Line, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 210 days.

(21) Appl. No.: 15/822,523

(22) Filed: Nov. 27, 2017

(65) Prior Publication Data

US 2019/0160922 A1    May 30, 2019

(51) Int. Cl.
| | |
|---|---|
| *B60J 5/04* | (2006.01) |
| *E05D 3/02* | (2006.01) |
| *E05D 5/04* | (2006.01) |
| *E05F 5/06* | (2006.01) |
| *E05D 7/10* | (2006.01) |
| *E05C 7/00* | (2006.01) |
| *E05D 3/04* | (2006.01) |
| *E05D 11/10* | (2006.01) |
| *E05D 11/06* | (2006.01) |

(52) U.S. Cl.
CPC .......... *B60J 5/0486* (2013.01); *B60J 5/0477* (2013.01); *B60J 5/0487* (2013.01); *E05C 7/00* (2013.01); *E05D 3/02* (2013.01); *E05D 3/04* (2013.01); *E05D 5/043* (2013.01); *E05D 7/10* (2013.01); *E05D 11/1085* (2013.01); *E05F 5/06* (2013.01); *E05D 11/06* (2013.01); *E05Y 2900/531* (2013.01)

(58) Field of Classification Search
CPC ...... B60J 5/0477; B60J 5/0486; B60J 5/0487; E05D 3/02; E05D 3/04; E05D 11/1085; E05D 11/06; E05D 7/10; E05C 7/00; E05F 5/06; E05Y 2900/531
USPC .......................... 296/146.11, 146.12, 146.13
See application file for complete search history.

(56) References Cited

U.S. PATENT DOCUMENTS

| | | | |
|---|---|---|---|
| 1,323,177 A * | 11/1919 | Ellison .................. | B60J 5/0473 296/146.13 |
| 2,682,427 A | 6/1954 | Bright | |
| 6,070,296 A | 6/2000 | Abeln et al. | |
| 7,097,229 B1 * | 8/2006 | Chernoff .................. | B60J 5/047 296/146.1 |
| 7,281,753 B2 | 10/2007 | Curtis, Jr. et al. | |
| 7,488,029 B2 | 2/2009 | Lechkun et al. | |
| 7,802,525 B2 * | 9/2010 | Dawson .................. | B61D 3/182 105/243 |
| 7,980,621 B2 | 7/2011 | Elliott et al. | |
| 9,527,371 B2 | 12/2016 | Flores | |
| 9,623,807 B2 | 4/2017 | Singleton | |

(Continued)

*Primary Examiner* — D Glenn Dayoan
*Assistant Examiner* — Dana D Ivey
(74) *Attorney, Agent, or Firm* — David Coppiellie; Carlson, Gaskey & Olds

(57) ABSTRACT

A vehicle door assembly according to an exemplary aspect of the present disclosure includes, among other things, a first door, a second door and a first hinge assembly connected to the first door and the second door. The first door is movable between a first position and a second position about the first hinge assembly, and in the second position, the first door is received against the second door.

17 Claims, 10 Drawing Sheets

(56) References Cited

U.S. PATENT DOCUMENTS

| | | |
|---|---|---|
| 2004/0201229 A1 | 10/2004 | Shabana et al. |
| 2016/0362064 A1* | 12/2016 | Singleton .................. B60R 9/06 |
| 2017/0284142 A1 | 10/2017 | Jaranson et al. |
| 2018/0154745 A1* | 6/2018 | Shin ...................... B60J 5/0486 |

* cited by examiner

VEHICLE DOOR ASSEMBLIES

TECHNICAL FIELD

This disclosure relates to vehicle door assemblies that include movable doors that can be opened and latched into position on the vehicle.

BACKGROUND

Motor vehicles commonly include one or more door assemblies for allowing passengers to enter and exit the vehicle. The door assemblies of certain types of sport utility vehicles (SUVs) and off-road vehicles include removable doors for providing vehicle passengers with an open air riding experience. These removable doors are often relatively heavy, difficult to remove, and typically cannot be stored on the vehicle.

SUMMARY

A vehicle door assembly according to an exemplary aspect of the present disclosure includes, among other things, a first door, a second door and a first hinge assembly connected to the first door and the second door. The first door is movable between a first position and a second position about the first hinge assembly, and in the second position, the first door is received against the second door.

In a further non-limiting embodiment of the foregoing vehicle door assembly, a second hinge assembly is connected to the first door and the second door.

In a further non-limiting embodiment of either of the foregoing vehicle door assemblies, a pivot axis of the first hinge assembly is aligned with a pivot axis of the second hinge assembly.

In a further non-limiting embodiment of any of the foregoing vehicle door assemblies, the first hinge assembly includes a first hinge arm connected to the first door and a second hinge arm connected to the second door.

In a further non-limiting embodiment of any of the foregoing vehicle door assemblies, the first hinge arm is vertically offset from the second hinge arm.

In a further non-limiting embodiment of any of the foregoing vehicle door assemblies, the first hinge assembly includes a hinge arm connected to the first door, a pin mounted to a vehicle body, and a locking pin that secures the hinge arm to the pin.

In a further non-limiting embodiment of any of the foregoing vehicle door assemblies, the hinge arm includes a first plurality of detents and the pin includes a second plurality of detents.

In a further non-limiting embodiment of any of the foregoing vehicle door assemblies, a liner is between the first plurality of detents and the second plurality of detents.

In a further non-limiting embodiment of any of the foregoing vehicle door assemblies, the assembly includes a latch system for latching the first door to the second door when the first door is in the second position. The latch system includes at least one of a striker assembly, a removable pin, or an elastic strap.

In a further non-limiting embodiment of any of the foregoing vehicle door assemblies, the second door is movable between a first position and a second position, and in the second position of the second door, the second door is received against the first door.

In a further non-limiting embodiment of any of the foregoing vehicle door assemblies, at least one of the first door and the second door includes a bumper.

In a further non-limiting embodiment of any of the foregoing vehicle door assemblies, the first hinge assembly includes a hinge platform mounted to an exterior surface of a vehicle body.

In a further non-limiting embodiment of any of the foregoing vehicle door assemblies, the first hinge assembly includes a first hinge arm connected to the first door and received over a first pin that protrudes from the hinge platform and includes a second hinge arm connected to the second door and received over a second pin that protrudes from the hinge platform.

In a further non-limiting embodiment of any of the foregoing vehicle door assemblies, the vehicle door assembly is removable from the vehicle body for storage at another location of the vehicle body.

A method according to another exemplary aspect of the present disclosure includes, among other things, unlatching a first door of a vehicle door assembly, moving the first door about a first hinge assembly until the first door contacts a second door, and securing the first door to the second door.

In a further non-limiting embodiment of the foregoing method, the method includes unlatching the second door and moving the second door and the first door as a single unit about the first hinge assembly.

In a further non-limiting embodiment of either of the foregoing methods, moving the first door includes swinging the first door about a uniaxial hinge axis of the first hinge assembly.

In a further non-limiting embodiment of any of the foregoing methods, securing the first door to the second door includes latching the first door to the second door.

In a further non-limiting embodiment of any of the foregoing methods, the method includes removing the first door and the second door from a vehicle body, securing the first door and the second door together with a tool, and storing the first door and the second door together at another location of the vehicle body.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
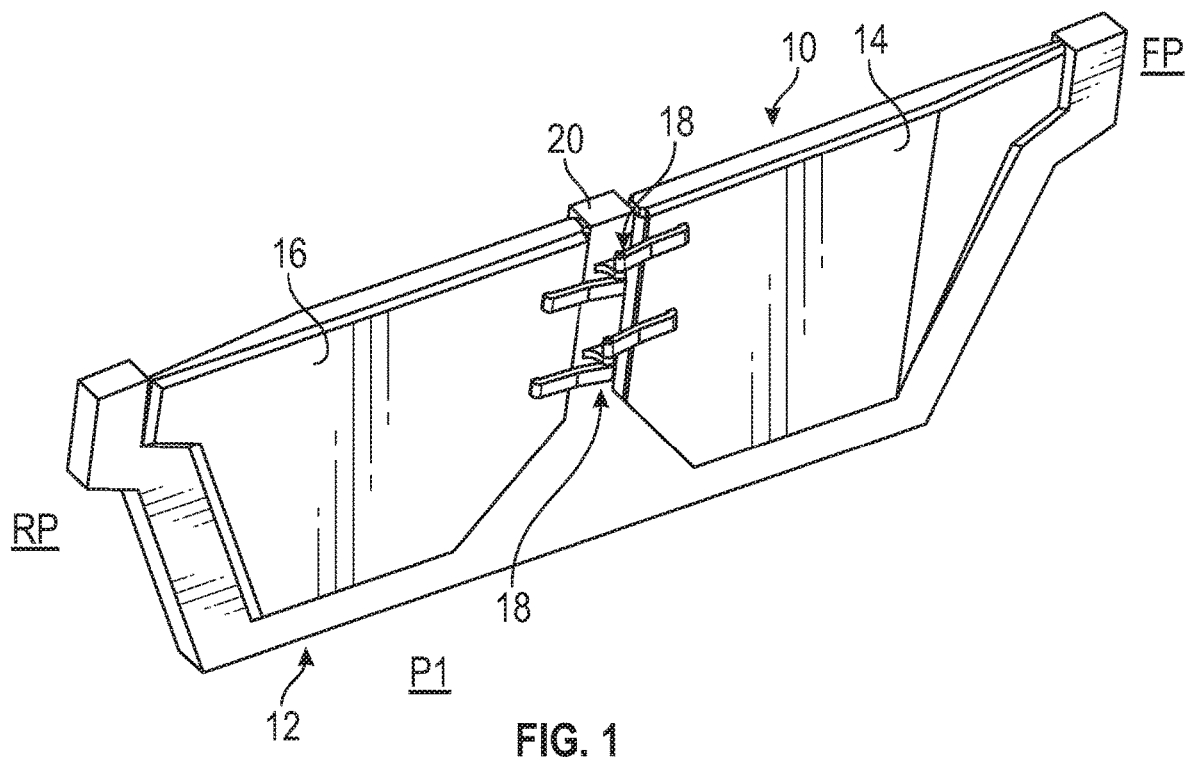
FIG. 1 illustrates an exemplary vehicle door assembly.

This disclosure details various vehicle door assemblies that include one or more doors that can be opened and then secured to the vehicle while still opened. The opened and secured doors provide the feel of an open air driving experience without the need to remove the doors from the vehicle.

An exemplary vehicle door assembly according to this disclosure includes a first door, a second door, and a hinge assembly connected to both the first door and the second door. The first door is movable between first and second positions about the hinge assembly. The first door is received against the second door in the second position. Once in the second position, the first door may be secured to the second door. The vehicle may be operated with the first door in the second position to provide an open air driving experience. These and other features of this disclosure are described in greater detail below.

FIGS. 1-6 illustrate an exemplary vehicle door assembly 10. The vehicle door assembly 10 may be secured to a vehicle body 12. Although only select portions of the vehicle body 12 are schematically shown in the figures for simplicity, the vehicle body 12 could be part of any type of vehicle. For example, the vehicle body 12 could be part of a car, a truck, a van, a sport utility vehicle (SUV), a recreational vehicle, or any other type of vehicle.

Although a specific component relationship is illustrated in the figures of this disclosure, the illustrations are not intended to limit this disclosure. In other words, the placement and orientation of the various components of the vehicle door assembly 10 are shown schematically and could vary within the scope of this disclosure. In addition, the various figures accompanying this disclosure are not necessarily to scale, and some features may be exaggerated or minimized to show certain details of a particular component.

The vehicle door assembly 10 may include a first door 14, a second door 16, and one or more hinge assemblies 18 connected to both the first door 14 and the second door 16. Once mounted to a vehicle (see, e.g., the vehicle 99 of FIGS. 16A-16C), the first door 14 is positioned nearer to a front portion FP of the vehicle, and the second door 16 is positioned nearer to a rear portion RP of the vehicle.

The first door 14 and the second door 16 are axially separated by a pillar 20 (e.g., a B-pillar) of the vehicle body 12. The hinge assemblies 18 are mounted to the pillar 20 for allowing each of the first and second doors 14, 16 to move relative to the vehicle body 12. In this embodiment, the first door 14 is considered to be "reverse hinged" or a "suicide door" since it is hinged at its rear rather than its front. This configuration allows the first door 14 and the second door 16 to be connected to common hinge assemblies 18.

FIG. 1 illustrates a first position P1 (e.g., a closed position) of the first and second doors 14, 16 of the vehicle door assembly 10. The first and second doors 14, 16 are closed and securely latched relative to the vehicle body 12 in the first position P1. Any type of latch can be used to latch the first and second doors 14, 16 to the vehicle body 12.

Figure 2:
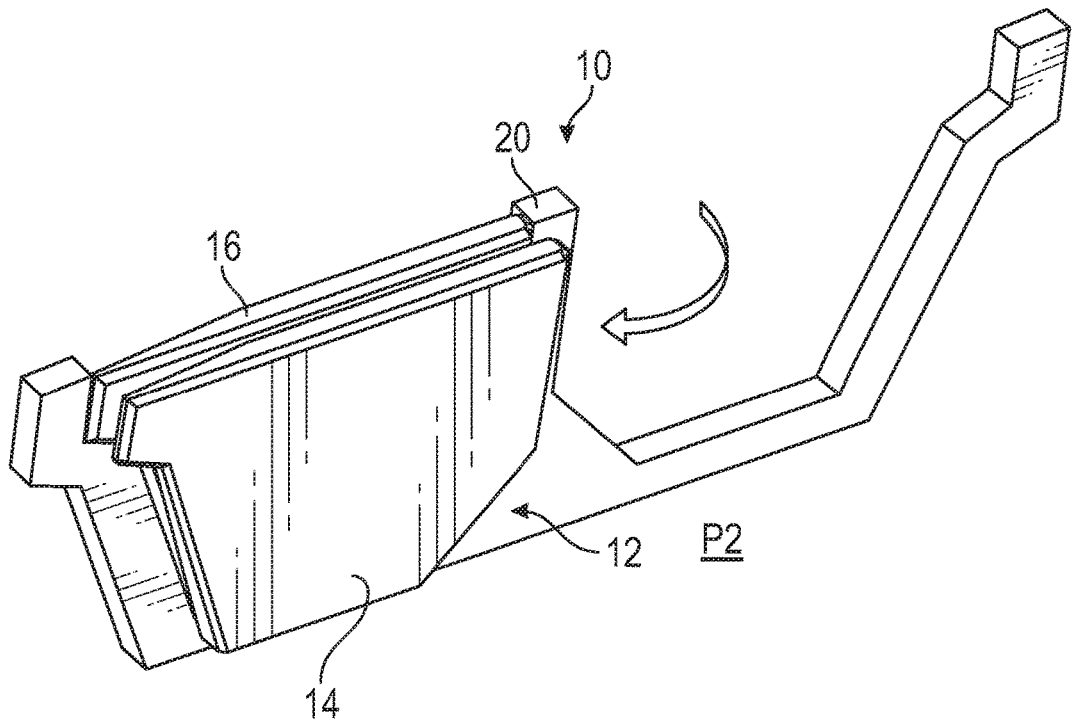
FIG. 2 illustrates the vehicle door assembly of FIG. 1 with a door of the assembly positioned in an open position.

FIG. 2 illustrates a second position P2 (e.g., opened position) of the first door 14. After being unlatched in a conventional manner (e.g., by pulling an interior latch release lever), the first door 14 may be moved between the first and second positions P1, P2. In an embodiment, the first door 14 is pivotable about the hinge assemblies 18 over a range of approximately 180°, or until the first door 14 contacts the second door 16 or a portion of the vehicle body 12, to move the first door 14 to the second position P2. Passengers may enter or exit the vehicle when the first door 14 is in the second position P2.

Figure 5A:
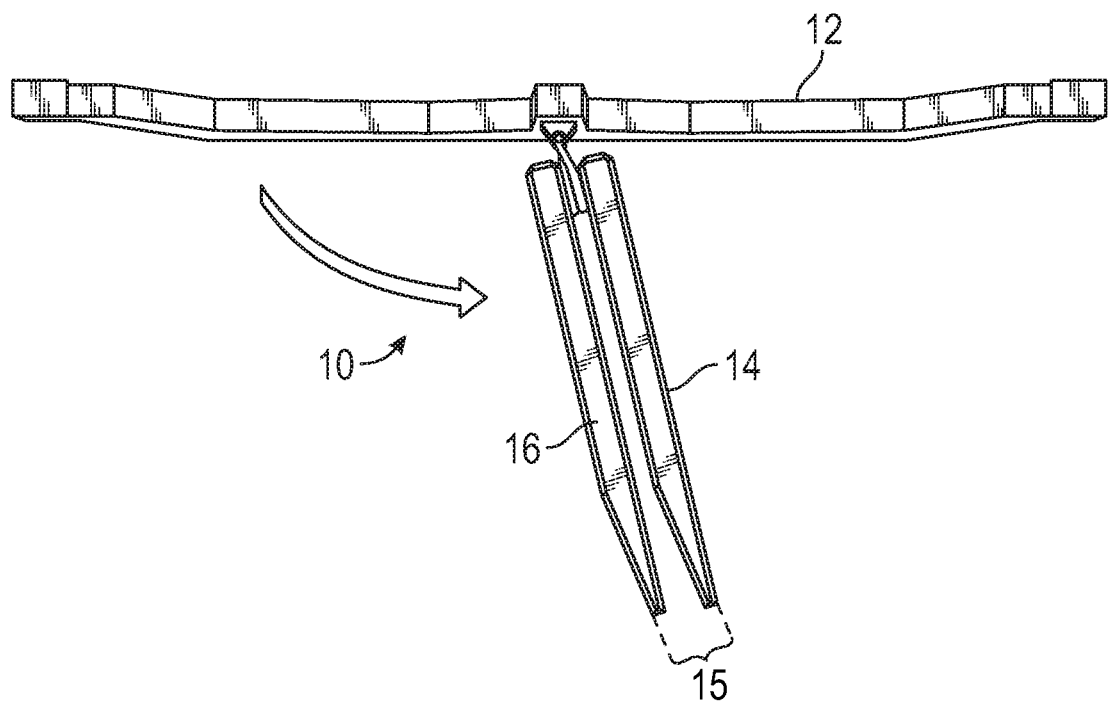
FIGS. 5A and 5B schematically illustrate the ability to move first and second doors of a vehicle door assembly together as a single unit.
Figure 5B:
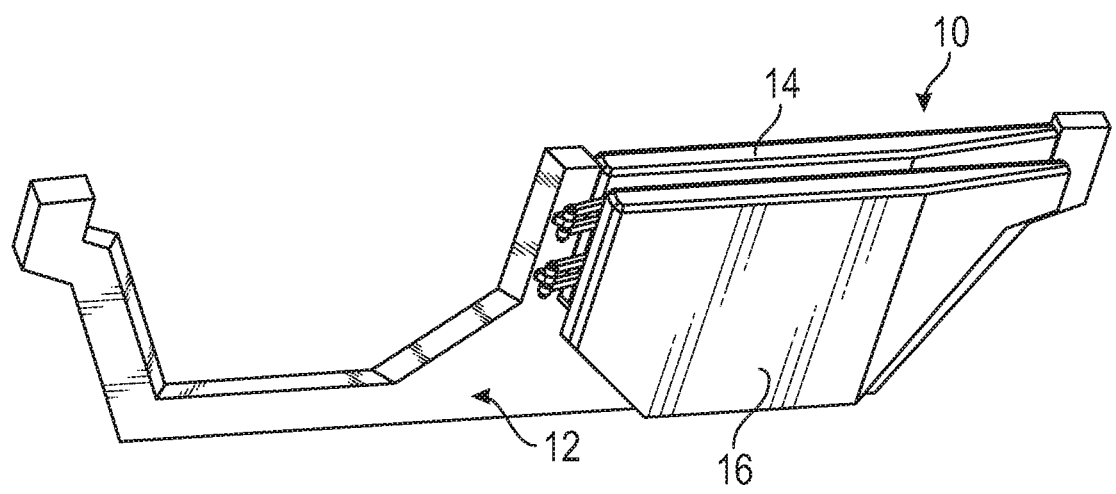

The second door 16 may be similarly moved between first and second positions P1, P2 (see, e.g., FIGS. 1 and 5B). Passengers may enter or exit the vehicle when the second door 16 is positioned in the second position P2.

Figure 3:
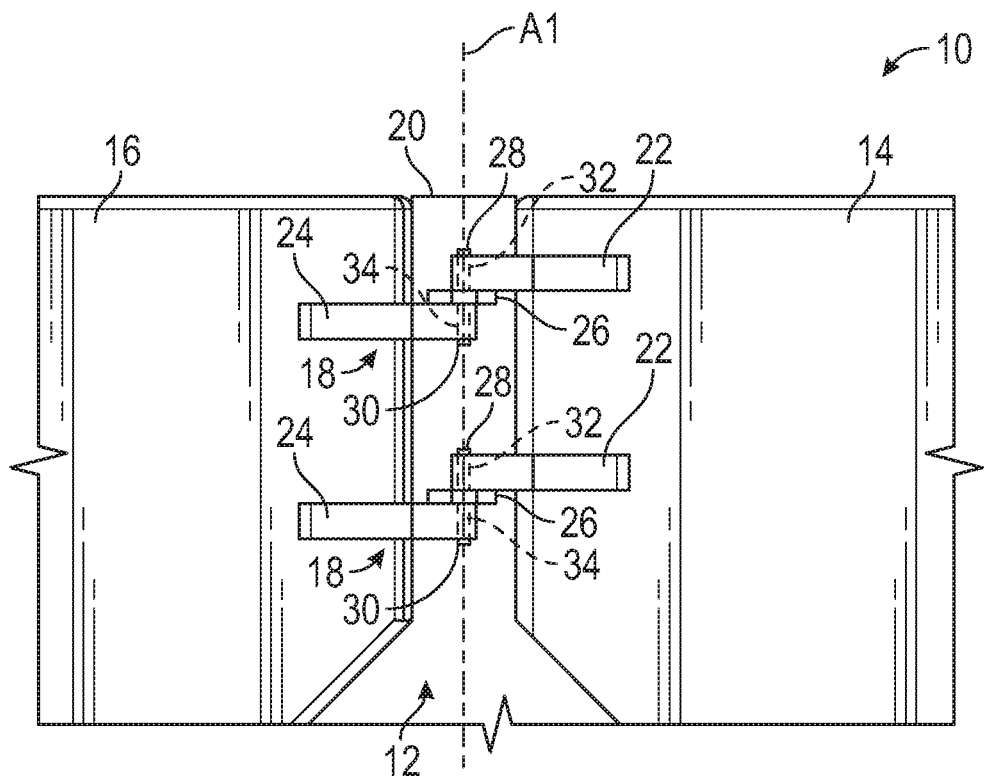
FIG. 3 illustrates a hinge arrangement for securing the vehicle door assembly of FIG. 1 to a vehicle body.
Figure 4:
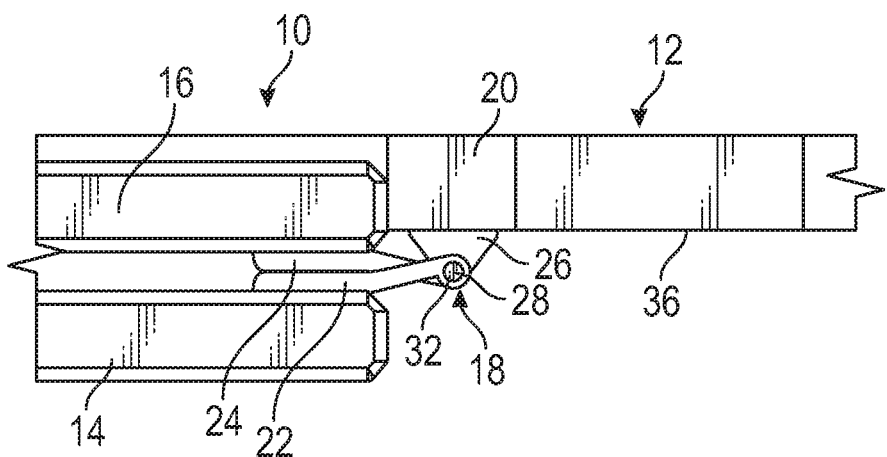
FIG. 4 illustrates an exemplary hinge assembly of the hinge arrangement of FIG. 3.

Referring primarily to FIGS. 3 and 4, the first and second doors 14, 16 are hingedly connected to the vehicle body 12 by the hinge assemblies 18. In an embodiment, two hinge assemblies 18 movably connect the first and second doors 14, 16 to the vehicle body 12. However, it should be understood that a greater or fewer number of hinge assemblies could be utilized within the scope of this disclosure.

Each hinge assembly 18 may include a first hinge arm 22 connected to the first door 14, a second hinge arm 24 connected to the second door 16, and a hinge platform 26 mounted to the pillar 20 of the vehicle body 12. The hinge platform 26 may include a first pin 28 that protrudes upwardly from the hinge platform 26 and a second pin 30 that protrudes downwardly from the hinge platform 26. The first hinge arm 22 may include an opening 32 for receiving the first pin 28 to connect the first door 14 to the hinge assembly 18, and the second hinge arms 24 may include an opening 34 for receiving the second pin 30 to connect the second door 16 to the hinge assembly 18.

The first and second doors 14, 16 can be easily connected to or removed from the hinge assembly 18 by sliding the first and second hinge arms 22, 24 onto or off of the pins 28, 30. As described in greater detail below, a locking nut or locking pin can be used to prevent the first and second hinge arms 22, 24 from slipping off of the pins 28, 30.

In an embodiment, each hinge assembly 18 includes a uniaxial hinge axis A1 (best illustrated in FIG. 3). The uniaxial hinge axis A1 prevents the first door 14 and the second door 16 from sliding against each other while being swung or rotated between the first and second positions P1, P2. In another embodiment, if multiple hinge assemblies 18 are utilized within the vehicle door assembly 10, the uniaxial hinge axes A1 of each hinge assembly 18 are aligned with one another such that the doors 14, 16 always swing, pivot, rotate, or otherwise move about a single pivot axis.

The first hinge arm 22 and the second hinge arm 24 of each hinge assembly 18 may be offset or displaced from one another to allow the first door 14 and the second door 16 to nest together when either door 14, 16 is moved to the second position P2. In an embodiment, the first hinge arm 22 is vertically offset from the second hinge arm 24 to permit the doors 14, 16 to nest together. Once the first and second doors 14, 16 are nested together, the doors 14, 16 may be swung in unison as a single unit 15 (see, e.g., FIG. 5A). In an embodiment, the hinge platform 26 of each hinge assembly 18 protrudes outwardly from an exterior surface 36 of the vehicle body 12 in order to enable the swinging movement (e.g., up to 180°) of the first door 14, the second door 16, or the first and second doors 14, 16 together.

Figure 6:
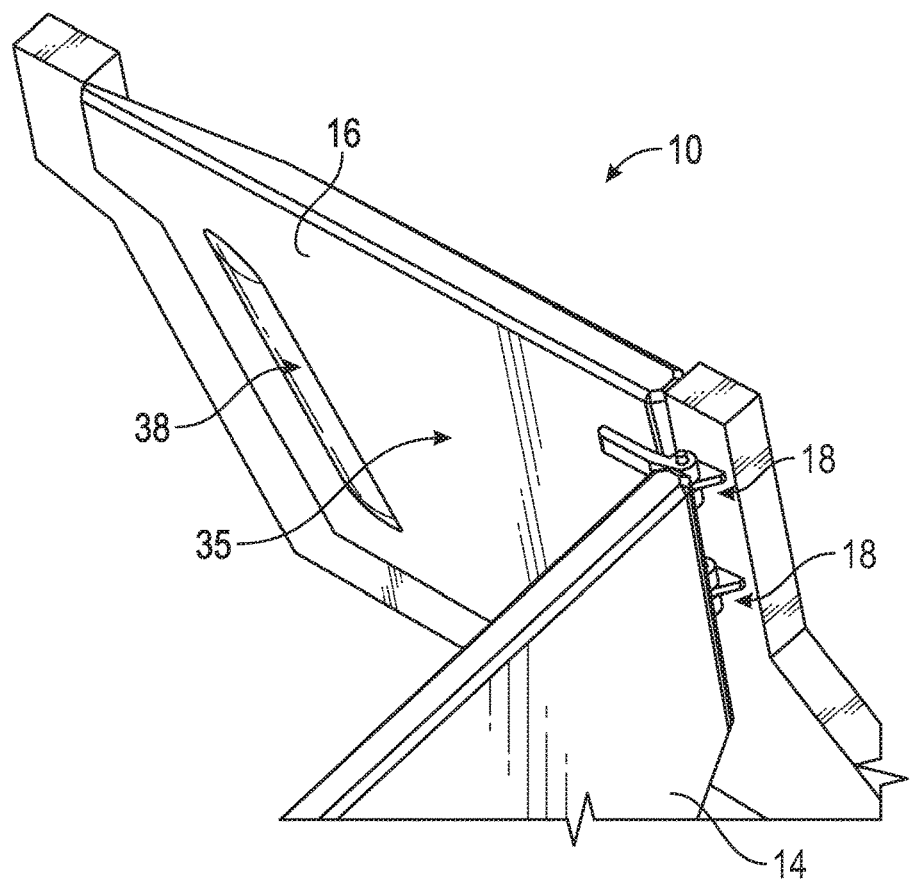
FIG. 6 illustrates a door bumper of a vehicle door assembly.

Referring to FIG. 6, either the first door 14, the second door 16, or both may include a bumper 38. The bumper 38 protrudes outwardly from an exterior surface 35 of the door 14, 16 and prevents paint-to-paint contact between the doors 14, 16 when they are nested together. In an embodiment, the bumper 38 is configured in the shape of a vehicle badge that helps identify the make and/or model of the vehicle. The bumper 38 can therefore be a logo, symbol, word, or any combination of logos, symbols, and words. The configuration of the bumper 38 is not limited to the specific badge design shown in FIGS. 1, 2, and 6.

Figure 7:
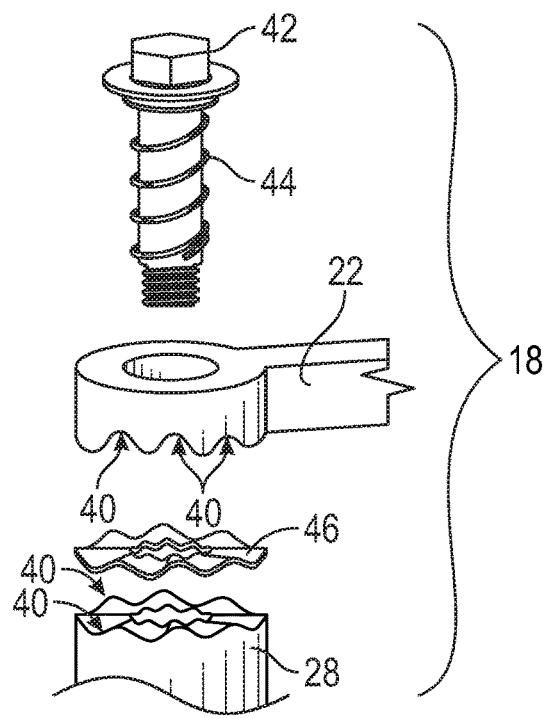
FIG. 7 is a blown up, exploded view of a portion of an exemplary hinge assembly of a vehicle door assembly.

FIG. 7, with continued reference to FIGS. 3 and 4, illustrates an exemplary hinge assembly 18 that can be utilized within the vehicle door assembly 10. In an embodiment, detents 40 may be formed in each of the first hinge arm 22 and the first pin 28. The detents 40 represent small grooves that prevent the first door 14 from swinging out of detent position by its weight alone. The detents 40 may be provided at certain positions of each of the first hinge arm 22 and the first pin 28 to provide a desired amount of incremental door movement. In an embodiment, the detents 40 are spaced around 30° apart from one another, although other detent spacings are also contemplated.

A locking pin 42 may secure the first hinge arm 22 to the first pin 28. Although shown separately, the locking pin 42 could be an integral component of the first pin 28. A spring 44 may be received over the locking pin 42 to provide tension as the first door 14 is swung from detent-to-detent. In addition, a liner 46 may be positioned between the detents 40 of the first hinge arm 22 and the first pin 28. The liner 46 prevents these components from binding and causing unwanted squeaking noises or unsmooth movement. In an embodiment, the liner 46 is a wavy washer.

Although the detents 40 of FIG. 7 are described in the preceding paragraphs with reference to the first door 14, a similar detent design could be provided on both the second hinge arm 24 and the second pin 30 to provide for incremental door movement of the second door 16.

Figure 8A:
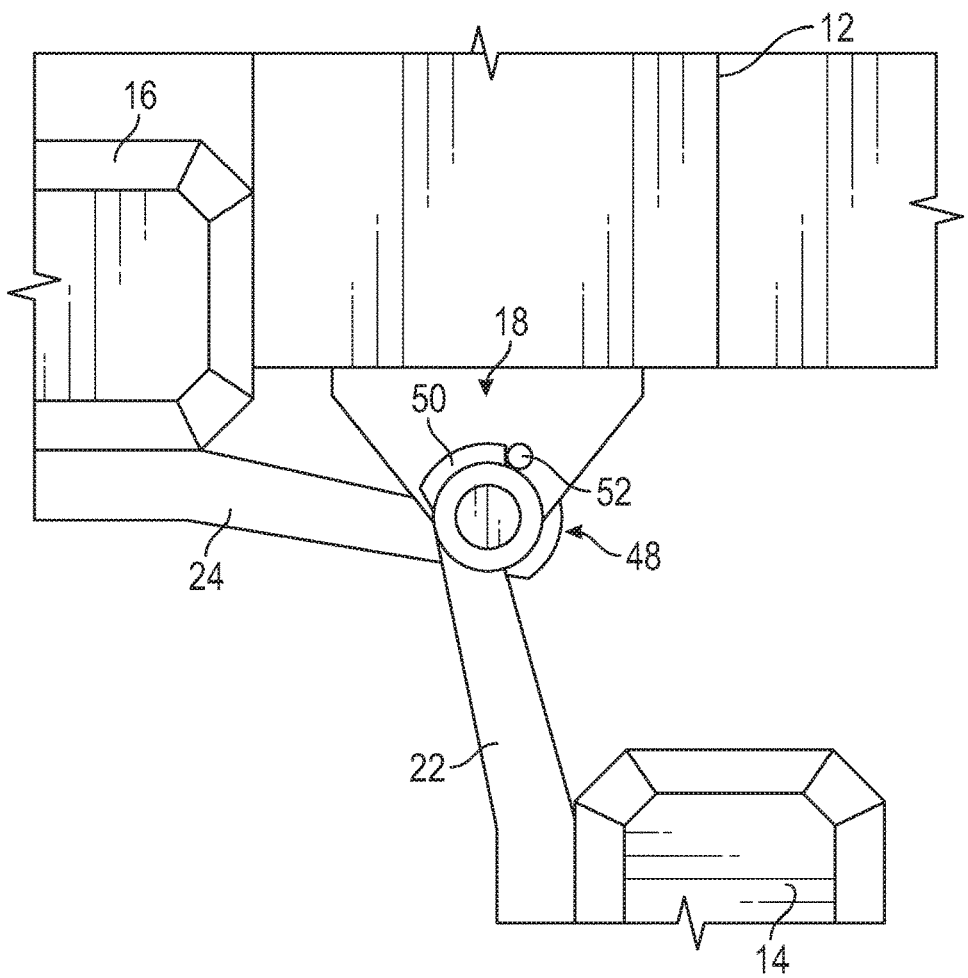
FIGS. 8A, 8B, and 8C illustrate door release stops of a hinge assembly of a vehicle door assembly.
Figure 8B:
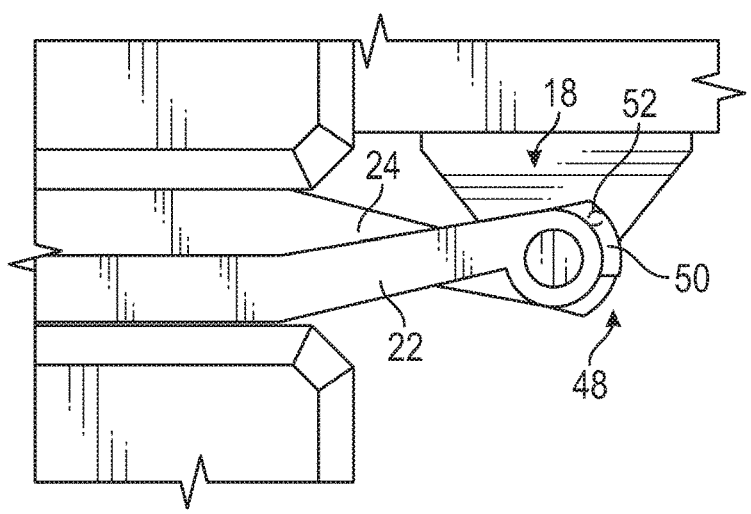

Referring now to FIGS. 8A and 8B, each hinge assembly 18 may additionally include a door release stop 48. If provided, the door release stop 48 acts as a final detent of the hinge assembly 18 by blocking movement of the first door 14 past a certain open point. For example, the first hinge arm 22 may include a hinge cam 50 (i.e., a ridge or wing that protrudes from the first hinge arm 22) that abuts the door release stop 48 to prevent the first door 14 from opening beyond a certain point (e.g., past 90° from the closed position P1) until a spring loaded pin 52 is released by the user. Once the spring loaded pin 52 is actuated, the hinge cam 50 holds the spring loaded pin 52 in the depressed position when the first door 14 is opened beyond 90° and allows the spring loaded pin 52 to pop back into position when the first door 14 is closed to less than 90°.

Although the door release stop 48 of FIGS. 8A and 8B are described in the preceding paragraphs with reference to the first door 14, a similar door release stop design could be provided for the second door 16

Figure 8C:
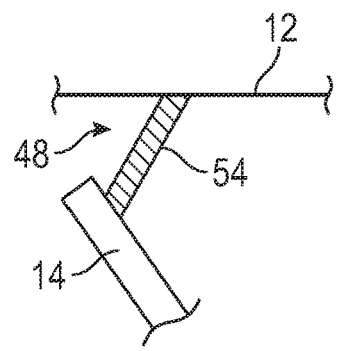

In an alternative embodiment, shown in FIG. 8C, the door release stop 48 could include a strap 54 that acts as a detent stop. The strap 54 can be removed from either the vehicle body 12 or the first door 14 to allow the first door 14 to open beyond a certain point.

The doors 14, 16 may be latched together once either the first door 14 or the second door 16 is moved to the second (i.e., open) position P2. This can be achieved using a variety of latching mechanisms, examples of which are described below. A vehicle that is equipped with the vehicle door assembly 10 may be operated with either the first door 14 or the second door 16 opened and latched in the second position P2 to provide an open air driving experience without the need to completely remove the doors 14, 16 from the vehicle.

Figure 9A:
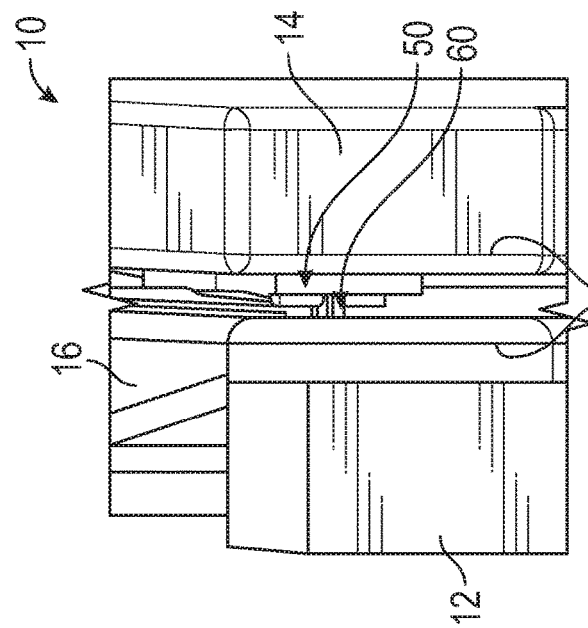
FIGS. 9A, 9B, and 9C illustrate a latch system of a vehicle door assembly according to first embodiment of this disclosure.
Figure 9C:
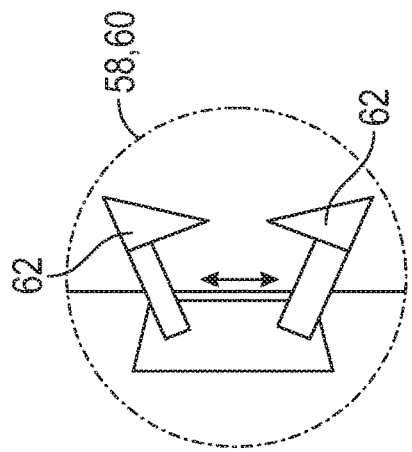
Figure 9B:
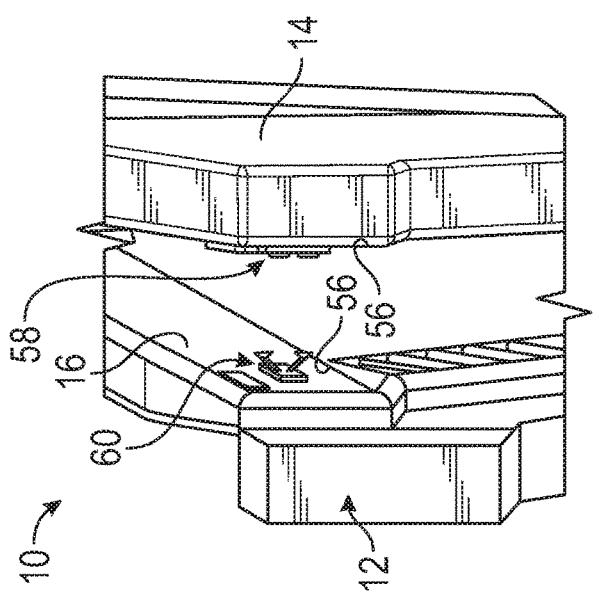

In a first embodiment, shown in FIGS. 9A-9C, a latch system 56 of the vehicle door assembly 10 includes a first striker assembly 58 on the first door 14 and a second striker assembly 60 located on the second door 16. Each striker assembly 58, 60 includes a pair of latch arms 62 (best shown in FIG. 9C) that are configured to automatically engage the latch arms 62 of the other striker assembly 58, 60 when either door 14, 16 is swung open and moved into contact with the other door 14, 16. The latch arms 62 may be moved apart from one another by actuating the latch release lever (not shown) of the door 14, 16. In an embodiment, the latch arms 62 of the first striker assembly 58 are mounted in a position that is displaced by about 90° relative to the latch arms 62 of the second striker assembly 60 in order for the latch arms 62 to easily engage and disengage relative to one another.

Figure 10:
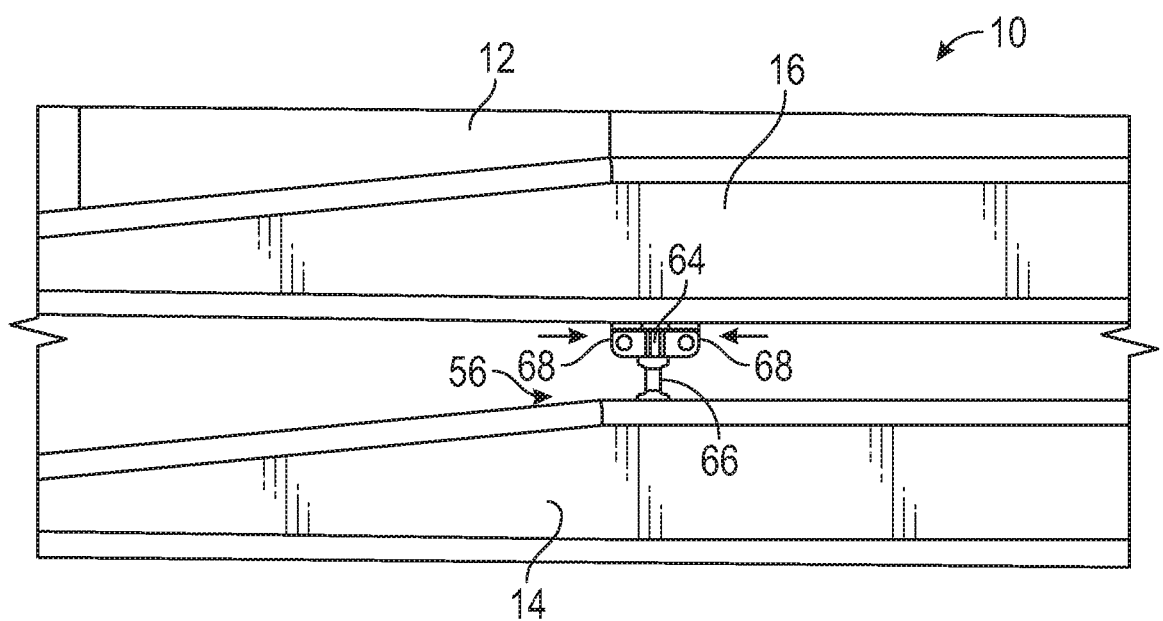
FIG. 10 illustrates a latch system of a vehicle door assembly according to a second embodiment of this disclosure.

In a second embodiment, shown in FIG. 10, the latch system 56 is a squeeze release system that includes a catch 64 and a latch arm 66 configured to automatically engage the catch 64 when either door 14, 16 is swung open and contacts the other door 14, 16. The catch 64 may be connected to the second door 16 and the latch arm 66 may be connected to the first door 14, or vice versa. The latch arm 66 may be disengaged from the catch 64 by squeezing buttons 68 located on the catch 64.

Figure 11:
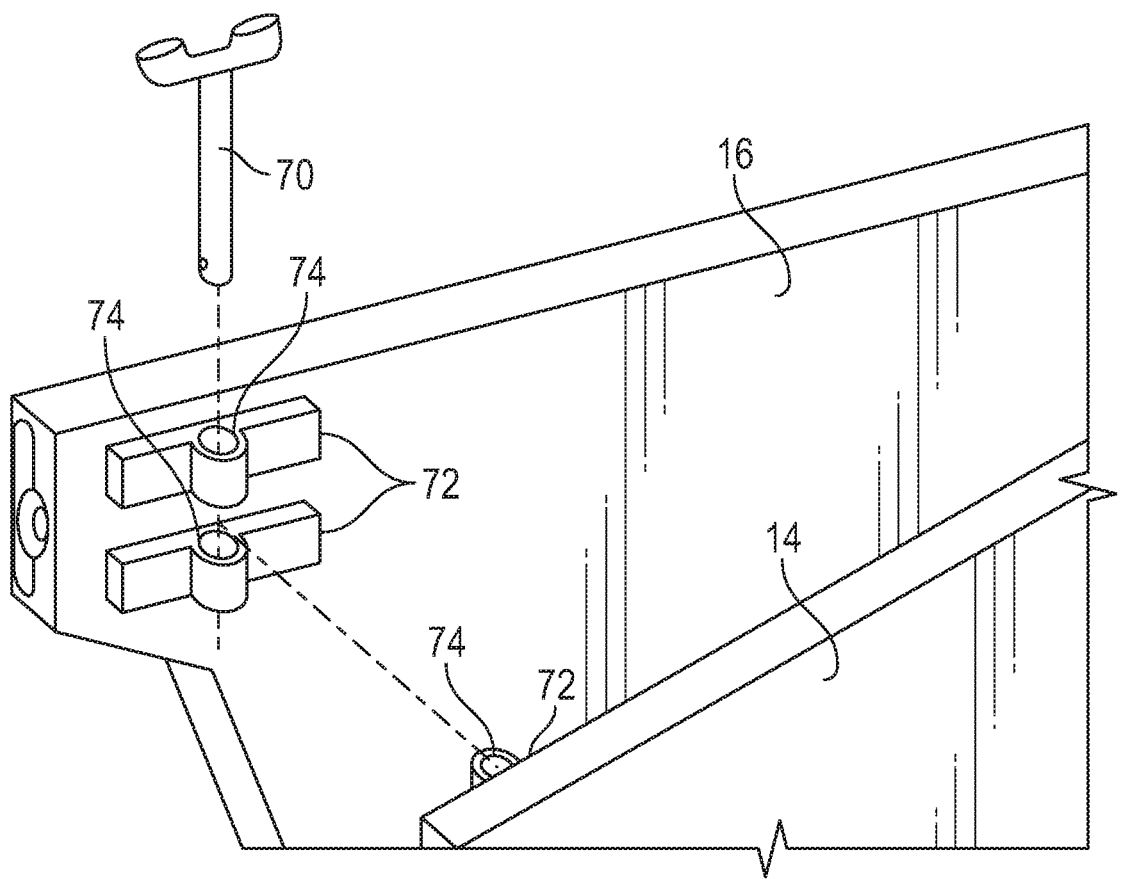
FIG. 11 illustrates a latch system of a vehicle door assembly according to a third embodiment of this disclosure.

In a third embodiment, shown in FIG. 11, the latch system 56 includes a removable pin 70. After the doors 14, 16 have been moved into contact with one another, the removable pin 70 may be inserted through brackets 72 that are connected to both the first door 14 and the second door 16. Openings 74 of the brackets 72 align with one another for receiving the removable pin 70 when the doors 14, 16 are moved into contact with one another.

Figure 12:
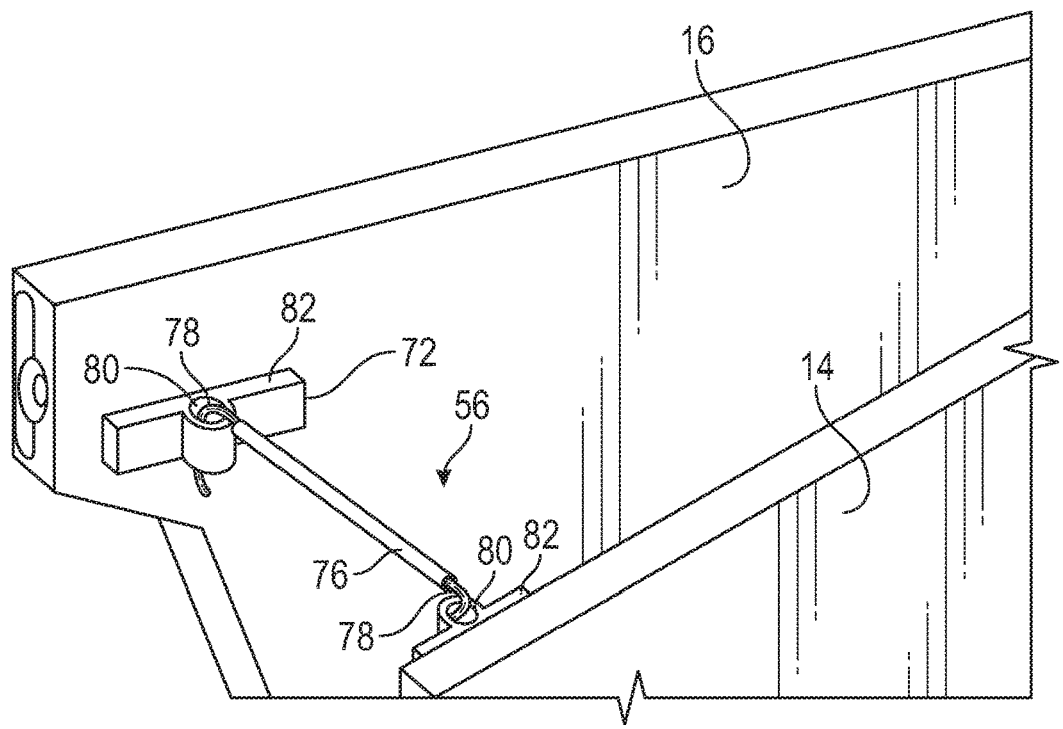
FIG. 12 illustrates a latch system of a vehicle door assembly according to a fourth embodiment of this disclosure.

In a fourth embodiment, shown in FIG. 12, the latch system 56 may include an elastic strap 76 having a hook 78 at each opposing end. The hooks 78 may be inserted through openings 80 in brackets 82 that are attached to each door 14, 16 to secure the doors 14, 16 in place.

Figure 13:
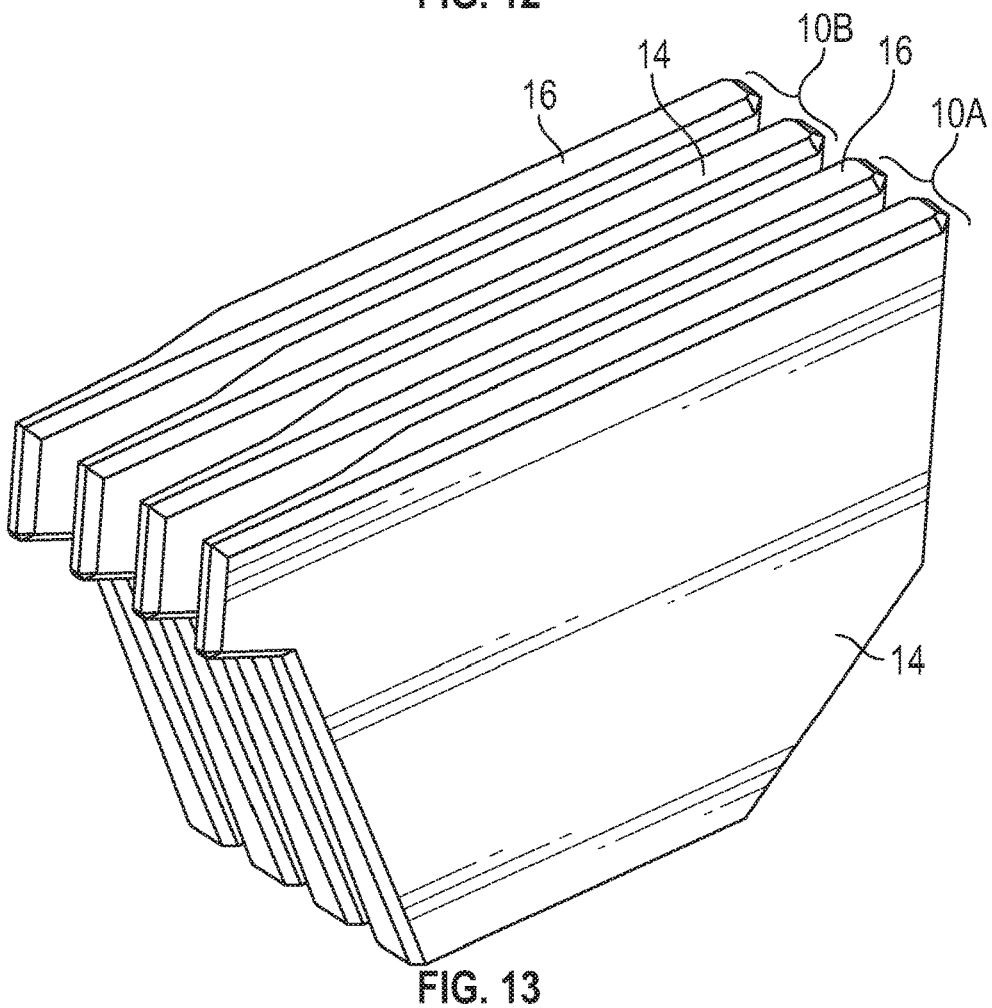
FIG. 13 illustrates a pair of vehicle door assemblies that are connected together for storage on a vehicle.
Figure 15:
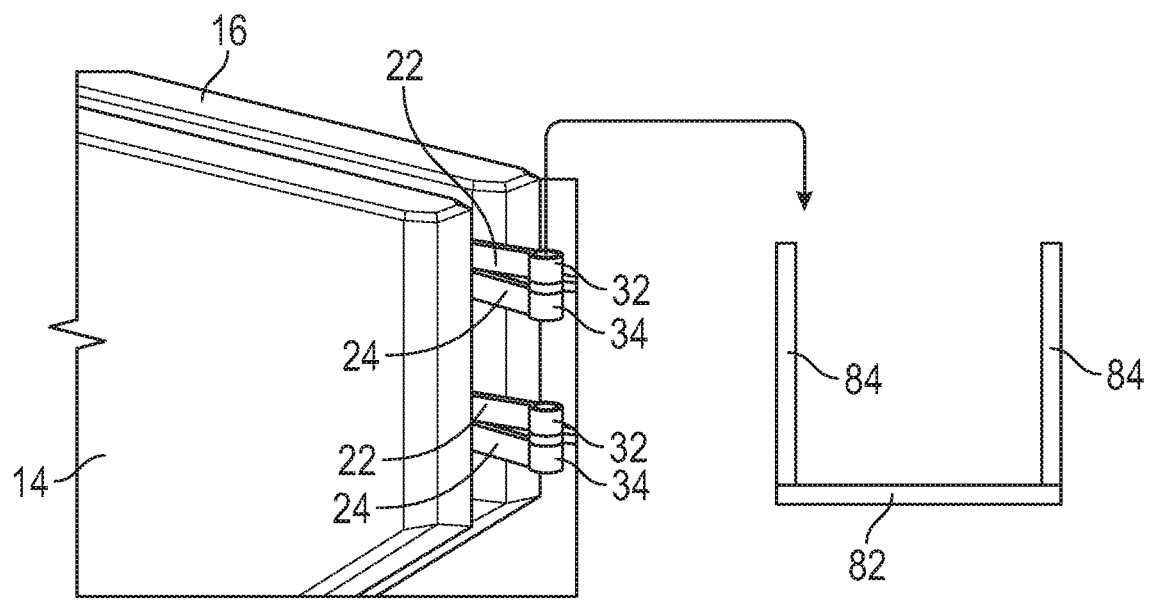
FIG. 15 illustrates a tool for nesting together multiple vehicle door assemblies.

Although not necessary for the user to experience the feel of open air driving, the first door 14 and the second door 16 of the vehicle door assembly 10 may be completely removed from the vehicle body 12. Once removed, the doors 14, 16 of two or more vehicle door assemblies 10 can be nested together and stored. FIG. 13 illustrates the doors 14, 16 of a first vehicle door assembly 10A nested together with the doors 14, 16 of a second vehicle door assembly 10B. The doors 14, 16 of the vehicle doors assemblies 10A, 10B may be nested together by leveraging the hinge arms 22, 24 of the hinge assemblies 18, which remain attached to the doors 14, 16 even after removing the doors 14, 16 from the vehicle body 12. A tool 82 (see FIG. 15) can be inserted through the openings 32, 34 of hinge arms 22, 24 to secure the doors 14, 16 together for storage. The ends of prongs 84 of the tool 82 can be secured with cotter pins to lock the doors 14, 16 onto the tool 82. Optionally, the tool 82 could be mounted to the vehicle body 12 to allow on-vehicle storage of the nested door assemblies 10A, 10B.

Figure 14:
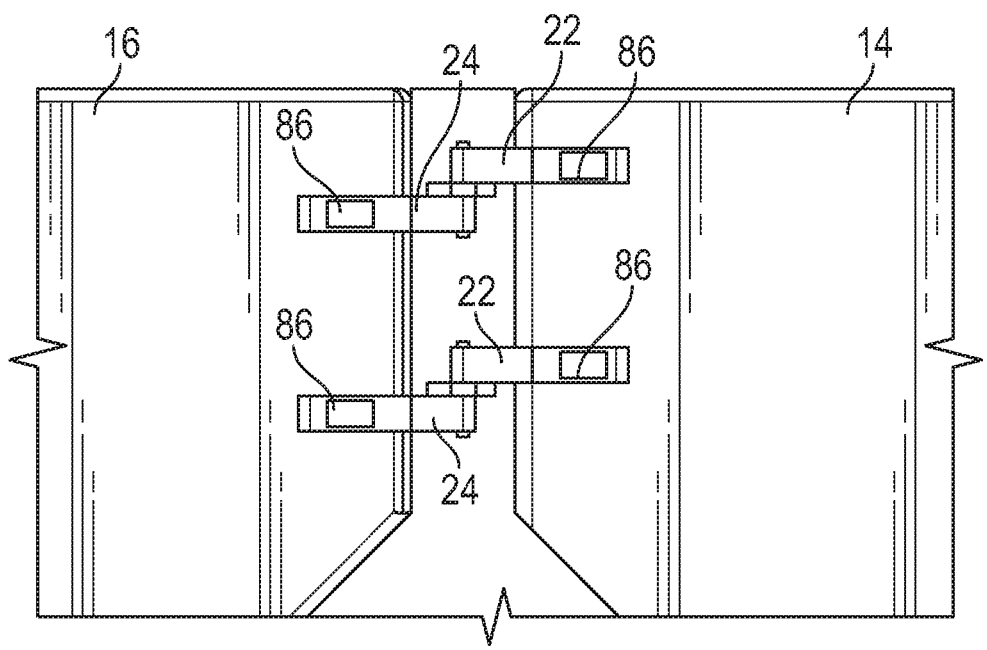
FIG. 14 illustrates another door bumper of a vehicle door assembly.

As shown in FIG. 14, in addition to the bumpers 38 shown in FIG. 6, additional bumpers 86 may be mounted to the hinge arms 22, 24 of the hinge assembly 18. The bumpers 86 help prevent damage on the hinge side of each door 14, 16.

Figure 16A:
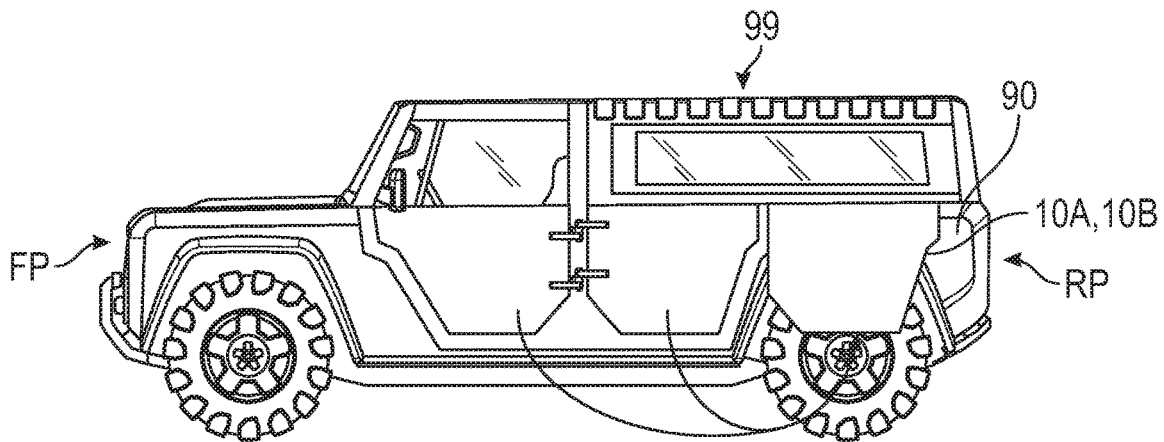
FIGS. 16A, 16B, and 16C schematically illustrate various on-vehicle locations for storing removable vehicle door assemblies.
Figure 16B:
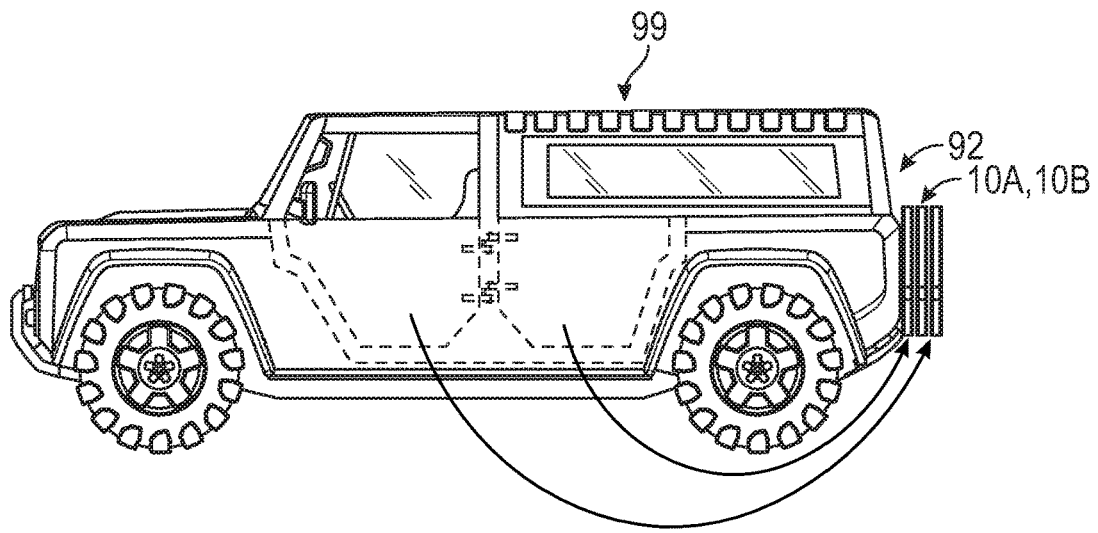
Figure 16C:
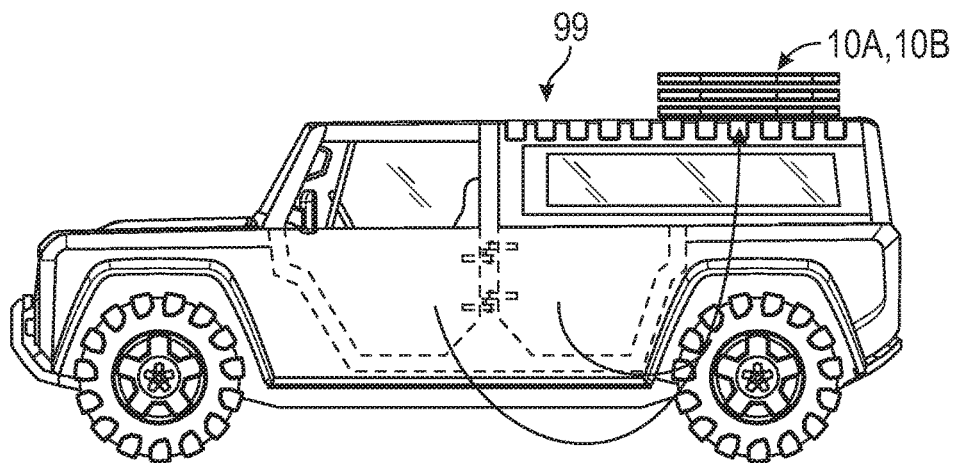

The nested vehicle door assemblies 10A, 10B can be stored at various exterior vehicle locations once removed from the vehicle body 12. FIGS. 16A-16C illustrate a few exemplary storage locations. In a first embodiment, shown in FIG. 16A, the nested door assemblies 10A, 10B may be mounted to a rear quarter panel 90 of a vehicle 99. In a second embodiment, shown in FIG. 16B, the nested door assemblies 10A, 10B may be mounted on a rear tire mount 92 of the vehicle 99. In a third embodiment, shown in FIG. 16C, the nested door assemblies 10A, 10B may be mounted to a roof 96 of the vehicle 99. Various other mounting locations are also contemplated within the scope of this disclosure.

The vehicle door assemblies of this disclosure combine the acts of removing the doors with the storage of the doors in a simple, time-efficient manner. The mechanism for removing the doors from the vehicle body requires a swinging movement rather than lifting the doors off their hinges, thereby significantly reducing the amount of effort necessary for door removal. Furthermore, the storage of the removed doors is on the vehicle and therefore does not impact vehicle interior storage volume. The latch systems of the proposed vehicle door assembles can further be leveraged in order to simplify door storage. The proposed vehicle door assemblies may additionally simplify installation by using the hinge assembly hardware to both ship and install the door assemblies as an assembled module.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle door assembly, comprising:
a first door;
a second door; and
a first hinge assembly connected to the first door and the second door;
wherein the first door is movable between a first position and a second position about the first hinge assembly,
wherein, in the second position, an exterior surface of the first door is received against an exterior surface of the second door,
wherein a first hinge arm of the first hinge assembly is mounted to a rear portion of the first door to configure the first door as a suicide door, and a second hinge arm of the first hinge assembly is mounted to a front portion of the second door.

2. The vehicle door assembly as recited in claim 1, comprising a second hinge assembly connected to the first door and the second door.

3. The vehicle door assembly as recited in claim 2, wherein a pivot axis of the first hinge assembly is aligned with a pivot axis of the second hinge assembly.

4. The vehicle door assembly as recited in claim 1, wherein the first hinge arm is vertically offset from the second hinge arm.

5. The vehicle door assembly as recited in claim 1, wherein the first hinge assembly includes the first hinge arm, a pin mounted to a vehicle body, and a locking pin that secures the first hinge arm to the pin.

6. The vehicle door assembly as recited in claim 5, wherein the first hinge arm includes a first plurality of detents and the pin includes a second plurality of detents.

7. The vehicle door assembly as recited in claim 6, comprising a liner between the first plurality of detents and the second plurality of detents.

8. The vehicle door assembly as recited in claim 1, comprising a latch system for latching the first door to the second door when the first door is in the second position, wherein the latch system includes at least one of a striker assembly, a removable pin, or an elastic strap.

9. The vehicle door assembly as recited in claim 1, wherein the second door is movable between a first position and a second position, and in the second position of the second door, the second door is received against the first door.

10. The vehicle door assembly as recited in claim 1, wherein at least one of the first door and the second door includes a bumper.

11. A vehicle comprising the vehicle door assembly as recited in claim 1.

12. The vehicle as recited in claim 11, wherein the first hinge assembly includes a hinge platform mounted to an exterior surface of a vehicle body.

13. The vehicle as recited in claim 12, wherein the first hinge arm is received over a first pin that protrudes from the hinge platform and includes the second hinge arm is received over a second pin that protrudes from the hinge platform.

14. The vehicle as recited in claim 12, wherein the vehicle door assembly is removable from the vehicle body for storage at another location of the vehicle body.

15. The vehicle door assembly as recited in claim 1, wherein the second position of the first door is about 180 degrees displaced from the first position of the first door.

16. A vehicle, comprising:
a vehicle body;
a first door secured to the vehicle body;
a second door secured to the vehicle body;
a pillar of the vehicle body separating the first and second doors; and
a first hinge assembly mounted to the pillar and connected to both the first door and the second door;
wherein, in a first configuration, the first door is pivotable in a first direction about the first hinge assembly for positioning the first door against the second door;

wherein, in a second configuration, the second door is pivotable in a second direction about the first hinge assembly for positioning the second door against the first door, wherein the second direction is an opposite direction from the first direction.

17. The vehicle as recited in claim 16, wherein, in a third configuration, the first door and the second door are pivotable together as a single unit in either the first direction or the second direction about the first hinge assembly.

* * * * *